United States Patent [19]
Imani

[11] Patent Number: 6,140,586
[45] Date of Patent: Oct. 31, 2000

[54] SYSTEM AND METHOD FOR CABLE BUNDLE PACKAGING AND DRESSING

[76] Inventor: Kamran Imani, 2509 Emmett Pkwy., Austin, Tex. 78728

[21] Appl. No.: 09/096,790

[22] Filed: Jun. 12, 1998

[51] Int. Cl.[7] .................................................. H01B 7/40
[52] U.S. Cl. .......................... 174/72 C; 174/93; 174/96; 174/98
[58] Field of Search ............................. 174/72 C, 72 TH, 174/70 C, 70 N, 72 R, 93, 96, 98, 99 R, 134; 29/518, 519, 728

[56] References Cited

U.S. PATENT DOCUMENTS

| | | | |
|---|---|---|---|
| D. 301,722 | 6/1989 | Sachs | D20/22 |
| 384,860 | 6/1888 | Meehan . | |
| 2,756,172 | 7/1956 | Kidd | 154/44 |
| 2,937,664 | 5/1960 | Plummer | 138/56 |
| 3,080,892 | 3/1963 | Plummer | 138/128 |
| 3,088,495 | 5/1963 | Svec | 138/128 |
| 3,357,455 | 12/1967 | Plummer | 138/106 |
| 3,483,313 | 12/1969 | Schauffhauser | 174/101 |
| 4,385,021 | 5/1983 | Neeley | 264/173 |
| 4,954,213 | 9/1990 | Jos et al. | 156/49 |
| 5,157,853 | 10/1992 | Piana et al. | 40/316 |
| 5,235,137 | 8/1993 | Jones et al. | 174/101.5 |
| 5,440,665 | 8/1995 | Ray et al. | 385/135 |
| 5,451,278 | 9/1995 | Nolf | 156/52 |

*Primary Examiner*—Dean A. Reichard
*Assistant Examiner*—Adolfo Nino
*Attorney, Agent, or Firm*—Gray Cary Ware & Freidenrich LLP

[57] ABSTRACT

A system and method for packaging and dressing of a cable bundle. A sleeving is used to encase a cable bundle including a number of actual cables. This sleeving contains several channels in which dummy cables may be installed for representing the actual cables of the cable bundle which the sleeve encases. The sleeve is held in place around the cable bundle using a closing assembly.

18 Claims, 2 Drawing Sheets

SYSTEM AND METHOD FOR CABLE BUNDLE PACKAGING AND DRESSING

TECHNICAL FIELD OF THE INVENTION

The present invention relates generally to mechanical systems and methods and more particularly, to a system and method for packaging and dressing of cable bundles that are used in any variety of applications requiring cable bundles including telecommunication systems, power systems, and computer networks.

BACKGROUND INFORMATION

There are virtually innumerable applications which require the installation of a number of cables in a bundled fashion. One very familiar application is within the telecommunications industry. Very often an enormous numbers of cables must be strewn along long distances to provide sufficient bandwidth for a large number of signal channels between two points. Invariably within any interconnected and complex network, some of the cables branch into and out of the bundled cables along the main bundles pathway. Along the way, several of the cables within the original bundle branch-out along the path to be directed to remote locations, and additional cables may need to be added to the main bundle.

A switchroom or similar type of facility is often dedicated to provide a central location where a relatively high number of cables or cable bundles meet for the purposes of redirecting and interconnecting to provide service to other points along the network. This switchroom or "node" of the telecommunications system often comprises a very large number of branchouts from cable bundles contained therein, as well as several interconnections among the cables of the various cable bundles. The sheer number of cables and cable connections contained within a relatively small area dictate that many of these cables cannot be emplaced within trays, conduit, or other known packaging methods and consequently are left visibly exposed within the switchroom.

Such switchrooms are common in a variety of locations such as electric power plants in which enormous numbers of cables must be interconnected throughout the plant not only for the generation and transmission of electricity, but also for safety monitoring and process control of the plant. Similarly, chemical refining plants also include an enormous number of cable bundles strewn throughout the plant for control and monitoring purposes. In recent decades with the maturation of the semiconductor industry, sophisticated fabrication methods often require significant monitoring and control as well. Even robotic, automated assembly lines used for the production of items such as automobiles and aircraft may require large numbers of cable bundles for not only delivering electric energy, but also for providing for signal transmission of monitoring and control processes of the robotics themselves but also of the status of the work pieces in the assembly line. This brief list of industrial applications utilizing some implementation of cable bundles is not intended to be exhaustive, and those skilled in the art can certainly appreciate that the fact that there are virtually innumerable applications which require the installation of a number of cables in a bundled fashion in both industrial and non-industrial applications.

A problem for cable bundles that are placed within areas of high visibility is the unsightliness of the cable bundle, particularly when the cable bundle has a disorganized appearance. FIG. 1 shows a very disorganized cable bundle 11. Unsightly and disorganized cable bundles are unacceptable to many users. However, throughput needs continue to increase within an existing network system, particularly within areas such as office buildings or industrial facilities where the cost to increase the physical structure of the site to accommodate additional cables and cable bundles may be simply prohibitive. Consequently, cable bundles integrated into the network and physical plant of the facility are often strewn along areas that were not dedicated for such purposes. For example, an old office building may not have been designed in the anticipation of the extremely large number of cables which must be strewn throughout to provide the many needs and services which a modern office building must furnish.

To avoid major restoration project to alter the building so that it may accommodate the large number of cables, the cables are often strewn in areas such as hallways, corridors and even along walls in vicinities that experience heavy human traffic or must be strewn in vicinities that comprise workspace which may include offices of non-maintenance and non-service personnel. This visual exposure to the cable bundles, particular in workplaces such as cubicle rooms or areas that are in plain sight of customers, may be undesirable given the readily apparent, visual disorganization of the vast numbers of cable bundles. As new technologies which require a transmission media are developed and integrated into network systems, the amount of electrical cables, fiber-optic cables, or similar media that employ a number of "cables" will continue to grow. Likewise, as cables are continually added to existing network systems, the switchrooms or "nodes" of those network systems will continue to become even more crowded and unsightly.

A conventional method to combat visual disorganization of cable bundles is to dress the cable bundles in an aesthetically pleasing manner. FIGS. 2 and 3 show examples of two cable bundles 12 and 13, respectively, manually dressed in two different ways. This manual dressing process is exceptionally costly in terms of man hours. The conventional method of FIGS. 2 and 3 involves aligning the cables of the bundles in a rigid geometric manner. The cables can be aligned in a parallel manner as shown in FIG. 2 or on top of and nesting next to one another as shown in FIG. 3.

FIGS. 4A and 4B show other conventional methods which may be used to combat the visual disorganization of cable bundles. Cable bundle 10 may be bound in a large bundle 21 wherein the cables are held together by using tie wraps 23 or some similar technology wrapped around the outer perimeter of the cable bundle. Cable bundle 10 may be either hung from a lateral surface 26 using vertical supports 27 as shown in FIG. 4B, laid flat across the ground, or placed across horizontal supports 22 which may extrude from a wall of a corridor, hallway, or switchroom as shown in FIG. 4A. A problem that often arises from these methods, especially when the number of cables in the bundle becomes very large is that the heavy weight of the bundle can cause damage to the cables at points adjacent to the supports. The majority of the weight of the bundle is concentrated on those few cables adjacent to the supports. This can lead either to breakdown of the insulation of those cables or electric failure in the continuity of those cables,due to the concentrated and severe mechanical stress at those locations. Additionally, the use of tie wraps 23 encircling the entire cable bundle can cause similar problems to the outermost cables of the bundle 10 in that the mechanical stress applied to the outermost cables at those precise locations, by pressing in on the cable bundle to hold it tight, is sufficiently strong that over time those outermost cables may experience insulation or continuity failure resulting in loss of transmission along those outermost cables.

One additional problem with conventional methods of cable bundle dressing arises when cables within the cable bundle must be redirected into or out of the cable bundle. FIG. 5 shows one such instance where a conventionally dressed cable bundle 31 comprises a first cable 32 which must be directed to a first patch panel 33 and a second cable 35 must be directed to a second patch panel 36. FIG. 5 also shows cable 37 exiting patch panel 33 and integrating into the cable bundle 31. When cables must be directed into or out of a cable bundle, the remaining cables in the bundle often need to be re-dressed to maintain the esthetically pleasing appearance of a dressed bundle. In FIG. 5, the cable bundle 31 must be re-dressed after cable 32 has branched from cable bundle 31 for the simple reason that the geometry of the bundle 31 has changed. Such re-dressing may require extensive man hours to recover the esthetically pleasing view that the cable bundle 31 provided before cable 32 was redirected out of the cable bundle 31.

A similar situation is presented when a cable is added to the cable bundle. The cable bundle must also be re-dressed to accommodate an extra cable that is integrated into the cable bundle as shown by cable 35 from patch panel 36 in FIG. 5. Similarly, when a second cable must be redirected from the cable bundle 31, additional man hours must be invested for the re-dressing of the cable bundle 31. Each and every time a cable within the cable bundle must be redirected from or added to the cable bundle, time intensive re-dressing of the cable bundle must be performed to maintain the bundle's dressing along its entire path. Hence, the conventional methods of dressing the cables is time intensive not only for initial installation, but also for any subsequent maintenance or alterations in the network system which require the re-dressing of the cable bundles.

SUMMARY OF THE INVENTION

A system is needed which can provide simplified installation and facilitate maintenance of cable bundles as throughput needs change, while overcoming the unsightliness of a disorganized cable bundle.

The present invention provides for the packaging and dressing of an exposed cable bundle which can also provide for the identification of the cables contained within the cable bundle. This invention may be used in any area in which an exposed cable bundle is desired to be packaged in such a way as to conceal the cable bundle itself, which may be twisted and disorganized, while simultaneously indicating cables are contained therein.

A sleeving is used to encase a cable bundle comprising a number of actual cables that are used for any variety of purposes including telecommunications, electric power system networks, computer networks, and telephone lines. The sleeving contains a number of channels in which dummy cables are placed for representing the actual cables within the cable bundle. The sleeving is visibly transparent to allow the identification of the dummy cables. The dummy cables are typically not connected into any system or network. The channels of the sleeving are aligned in parallel fashion to one another and can be physically connected along their lengths. The individual channels of the sleeving are typically connected to no more than two additional channels. The individual shape and dimensions of the channels which contain the dummy cables may take a variety of shapes and sizes without departing from the scope and spirit of the invention. Also, the cable bundle may contain cables of differing types such as some electrical cables and some fiber optic cables. The dummy cables may likewise be different cable types.

The present invention provides an important technical advantage by providing the appearance of a neatly dressed cable bundle while at the same time decreasing the time required for the installation and dressing of cable bundles.

The present invention provides another technical advantage by providing for easier maintenance of the cables within the cable bundle in that the sleeving may be easily removed and the cables need not be re-dressed if the number of cables within the bundles is later changed.

The present invention provides another technical advantage by reducing the stress on particular cables in a cable bundle caused by closing mechanisms and supports.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the "FIGS.", 1–7 like numerals being used to refer to like and corresponding parts of the various drawings.

The present invention provides for the packaging and dressing of exposed cable bundles. A sleeving is used to encase a cable bundle comprising a number of actual cables. This sleeving contains several channels in which dummy cables can be installed to provide identity of the cable bundle which the sleeve encases. The sleeve is held in place around the cable bundle using a closing mechanism. This cable packaging and dressing method provides an appearance of a dressed cable bundle without actually having to perform the very time-consuming dressing of the cables.

Figure 1:
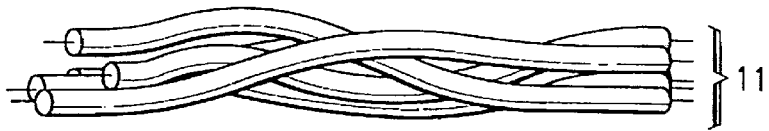
FIG. 1 shows a disorderly cable bundle.
Figure 2:
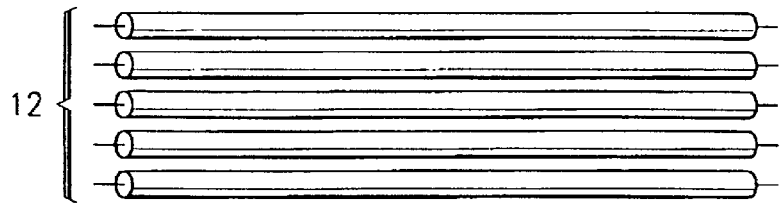
FIG. 2 shows a prior art conventionally dressed cable bundle.
Figure 3:
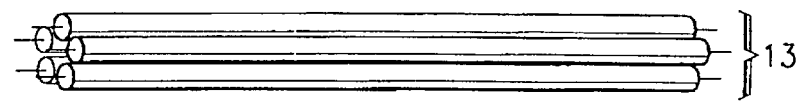
FIG. 3 shows another prior art conventionally dressed cable bundle.
Figure 4A:
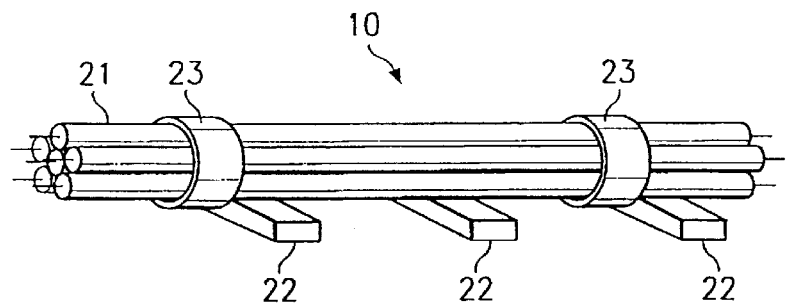
FIG. 4A shows a prior art conventionally dressed cable bundle held together by tie wraps resting on horizontal supports.
Figure 4B:
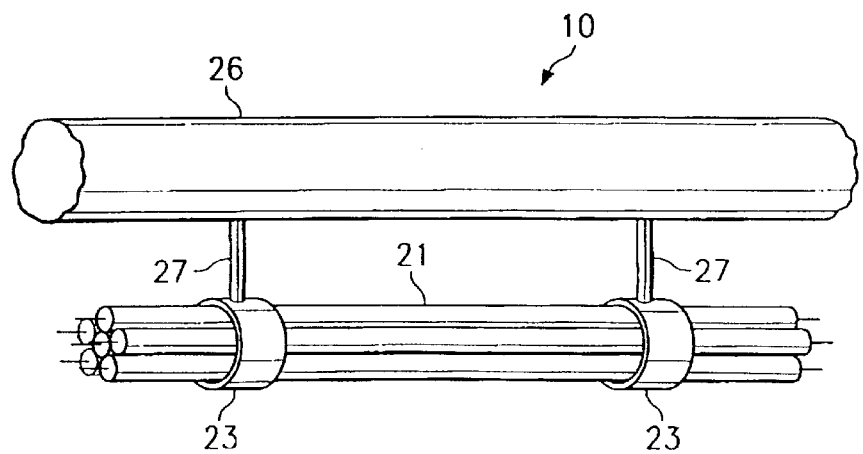
FIG. 4B shows a prior art conventionally dressed cable bundle held together by tie wraps hanging from a lateral surface.
Figure 5:
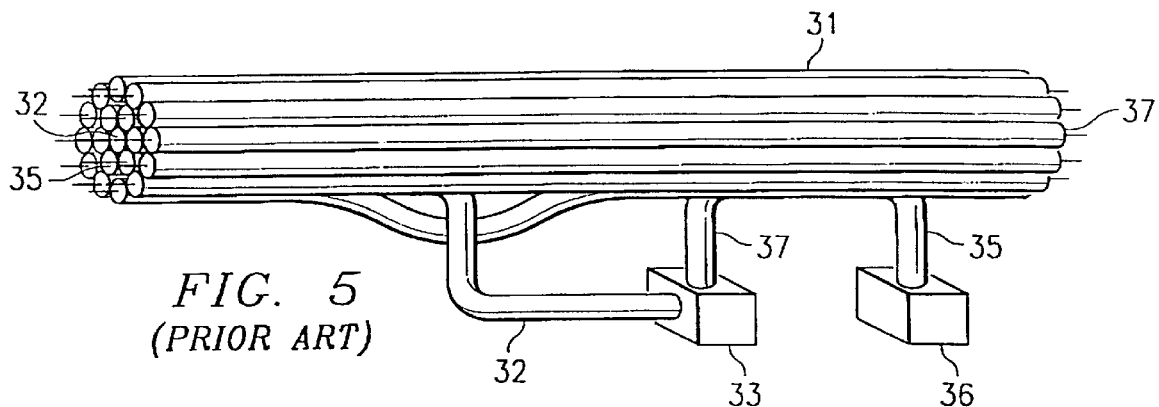
FIG. 5 shows a prior art conventionally dressed cable bundle where cables are directed into and out of the cable bundle.
Figure 6:
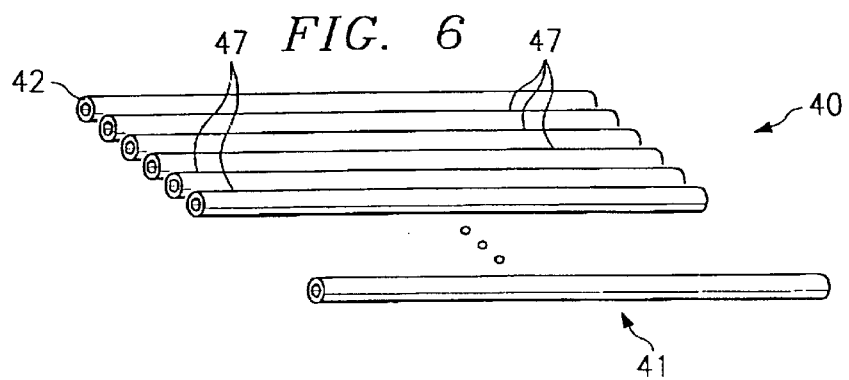
FIG. 6 shows the sleeving of one embodiment of the present invention.
Figure 7:
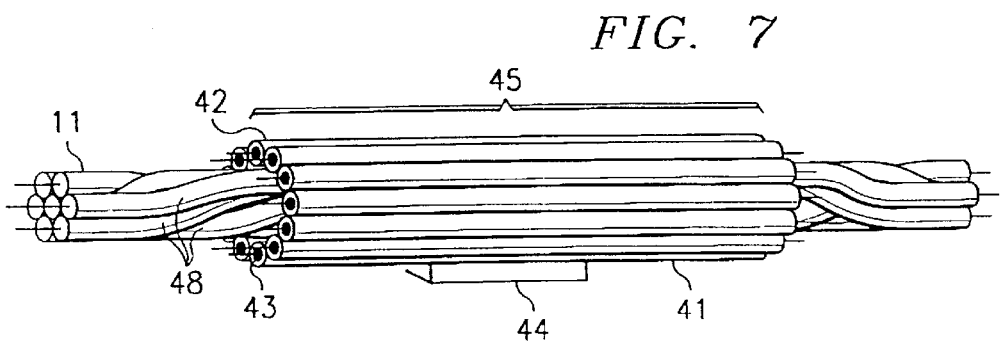
FIG. 7 shows the sleeving of the embodiment of FIG. 6 encasing a cable bundle.

FIG. 6 shows one embodiment of the packaging and dressing system 40 of the present invention before being installed onto a cable bundle. The invention comprises a sleeving 41 which further comprises a number of interconnected dummy cable channels 42. Dummy channels 42 of sleeving 41 should preferably be made of a visibly transparent material. As shown in FIG. 7, dummy cables 43 can then be placed inside dummy cable channels 42 of sleeving 41 to represent actual cables 48 within cable bundle 11. Sleeving 41 now has the appearance of a neatly dressed, operational cable bundle (i.e., the dummy cables 43 are representative of the actual cables 48 of the cable bundle 11). The interconnected dummy cable channels 42 can couple to one another along the length of the dummy channels 42 at edge interface 47 along the lengths of dummy channels 42, as shown in FIG. 6. The sleeving 41 can comprise any number of interconnected dummy channels 42. Any subset of the dummy channels 42 can be separated at any edge interface 47 to form sleeving 41. Sleeving 41 simply needs to comprise a sufficient number of dummy channels 42 so as to be able to enclose the actual cables in a cable bundle. Sleeving 41 is used to encase the visible portion 45 of cable bundle 11, as shown in FIG. 7. It should be understood that visible portion 45 could encompass any portion up to the entire length of cable bundle 11. Cable bundle 11 comprises a number of actual cables 48. Actual cables 48 can include elemental and/or optical cables, or any other type of cable.

After being wrapped around cable bundle 11, sleeving 41 can be held together using a closing mechanism 44. The closing mechanism 44 could comprise tie wraps, an integrated zipper, or any other mechanism suitable for closing the sleeving 41 around a cable bundle 11. Such a mechanism could comprise any number of mechanisms such as a tie wrap that holds the sleeving in place around the cable bundle, an integrated mechanism that extends all along the entire sleeving, or a mechanism that provides for discrete closings at distributed locations along the sleeving. This mechanism could also include an adhesive between the two outer-most dummy cable channels 42.

Sleeving 41 will assist in the protection of the outer cables of the cable bundle 11 by providing an additional buffer between whatever closing mechanism is used to keep the sleeving 41 in place and the actual cables 48 within the cable bundle 11. The sleeving 41 will also help distribute the weight of the cable bundle 11 by providing an additional buffer between the cable bundle 11 and any surface or support upon which cable bundle 11 is resting or being hung. Supports can extrude from a wall or hang from a horizontal surface and the cable bundle 11 is either hung from or attached to them. Similarly, the sleeving 41 of the present invention could be constructed as to provide for supporting it along a surface such as along a hallway or corridor or suspending it from the ceiling of such a hallway or corridor. Also, within environmentally hostile environments, sleeving 41 may be constructed of such a material as to provide additional protection to the cables of the cable bundle.

One application of the present invention involves placing sleeving 41 around cable bundle 11 so that visible portion 45 of the cable bundle 11 is sleeved by sleeving 41. The visible portion 45 could represent the portion of the cable bundle 11 that is visible from the point where the cable bundle 11 enters a room as it passes to a patch panel or computer. This example represents one such application where a user may wish to dress and package an unsightly cable bundle for the benefit of personnel who might work in the environment or of customers who might enter the environment.

The size and shape of the individual dummy channels 42 and the overall size and shape of the sleeving 41 may be modified to accommodate any number and variety of actual cables 48 without departing from the scope and spirit of the invention. Additionally, dummy cable channels 42 may be of different sizes for representing various types of actual cables within the cable bundle. For example, within one cable bundle 11, there may be cables of both fiber optic type and of copper wire type. Also, the dummy cable channels 42 and dummy cable 43 may be specifically designed to identically match the actual cables 48 within cable bundle 11 to provide a one-to-one correspondence between the actual cables and the dummy cables. Also, the shape of the sleeving 41 may be designed to comprise a particular shape that would better facilitate turning and twisting for particular applications in very tight space or which might undergo very sharp turns.

The system and method of the present invention provides for a substantial decrease in the time required to prepare a cable bundle 11 as compared to conventional packaging and dressing methods. The need to dress each, individual cable within a cable bundle 11 to provide a visually organized appearance is totally eliminated. The actual cables 48 of a cable bundle 11 are simply strewn and connected into the required network making no effort to organize the actual cables 48 in the conventional packaging and dressing manner. The sleeving 41 containing the dummy cables 43 encases the actual cables 48 of the cable bundle 11 to provide an organized visual appearance of the cable bundle 11. This visual organization is always provided for any cable bundle 11 irrespective of the actual organization of the actual cables 48 contained within the cable bundle 11, as only the sleeving 41 and the dummy cables 43 contained therein are visible.

In short, the manual dressing of the cable bundle 11, which is the most time intensive element of installation, is totally eliminated by providing visual organization through the sleeving 41 containing dummy cables 43 which wraps around the cable bundle 11. Furthermore, when modifications or maintenance are performed at later times on the cable bundle 11, the sleeving 41 may be peeled back to perform the required modification or maintenance function and then re-installed without regard to the actual organization of the cable bundle 11.

The present invention also provides for much easier maintenance of the cable bundle once the present invention is installed into the network system. For example, in the event the contents of the cable bundle must be altered after installation, the sleeving of the present invention may easily be pulled back and cables added or removed from the cable bundle without needing to re-dress the entire cable bundle. Similarly, if a cable must be serviced for any reason, the sleeving provides for easy access to the cable bundle and will subsequently cover all evidence of maintenance which may include splices and insulation repairs. Evidence of visual defects (e.g., defects that are unsightly but have no adverse effect on the cable operation) from such types of maintenance may very well require the replacement of the cable to eliminate the unsightliness of such evidence. The present invention eliminates this problem because visual defects in the actual cables 48 are hidden within sleeving 41.

The sleeving may be constructed of any material that will permit the twisting and bending along the path of the cable bundle which it covers. Any flexible material with sufficient strength to support the dummy cables 43 along at least a portion of the length of the cable bundles would suffice for the sleeving 41 of the present invention. Candidates of materials to be used for the sleeving 41 might include any semi rigid plastic, rubber, acrylic, polynomic materials, or any other such material that may be manufactured or molded in such a way as to provide visual transparency to allow the dummy cables 43 within the dummy cable channels 42 to be seen.

Additionally, the sleeving 41 should comprise a material such that the edge interface 47 connections between the various dummy cable channels 42 of the sleeving 41 may be disconnected to provide for a sleeving 41 having any desired number of channels 42. This way, a single design for the sleeving 41 may be manufactured which can be altered later by a user or customer to accommodate a cable bundle 11 comprising any number of actual cables 48. Also, the sleeving 41 may comprise one or more branchouts which facilitate the entrance of additional actual cables 48 into the cable bundle 11 or the exit of actual cables 48 within the cable bundle 11 for redirecting and re-routing as future needs of the network change as has been described throughout this invention.

After the sleeving 41 has been fitted by placing the desired dummy cables 43 into the desired dummy cable channels 42 of the sleeving 41, the sleeving 41 is then wrapped around the cable bundle 11 in such a manner as to provide for covering the actual cables 48 within the cable bundle 11 and representing the contents of the cable bundle 11. In one embodiment, the number of dummy cables 43 could correspond identically to the number of actual cables 48 within the cable bundle 11, providing a one to one correspondence between the actual cables 48 in the cable bundle 11 and the dummy cables 43 placed within the sleeving 41. Additionally, a number of dummy cable channels 42 could be left vacant to provide space for additional dummy cables 43 to be later added in the event that additional actual cables 48 are added to the cable bundle 11 to satisfy future needs of the network for which the cable bundle 11 provides service. The ease of performing this manner of maintenance is significantly increased as the sleeving 41 may be easily removed from the cable bundle 11 and the makeup of the cable bundle 11 altered without needing to re-dress the cable bundle 11 to ensure the esthetically pleasing view that many applications require (as described in BACKGROUND OF THE INVENTION).

The present invention provides several benefits including decreasing the time required for the installation and dressing of cable bundles and providing for easier maintenance of the cables within the cable bundle in that the sleeving may be easily removed and the cables need not be re-dressed if the number of cables within the bundles changes. Other benefits of the present invention include indicating the contents of the cable bundle while reducing the visual disorganization of a cable bundle and distributing the weight of a cable bundle among the cables of the bundle.

Although the present invention has been described in detail, it should be understood that various changes, substitutions and alterations can be made hereto without departing from the spirit and scope of the invention as described by the appended claims.

What is claimed is:

1. A packaging and dressing system for cable bundles, comprising:
    a cable bundle comprising a plurality of actual cables;
    a sleeving encasing said cable bundle, comprising:
        a plurality of dummy cables representing said plurality of actual cables; and
        a plurality of dummy cable channels holding said plurality of dummy cables, each dummy cable channel connecting along an edge interface to another dummy cable channel, each dummy cable channel being visibly transparent; and
    a closing mechanism that closes said sleeving around said cable bundle.

2. The system of claim 1, wherein said plurality of dummy cables and said plurality of actual cables comprise the same number providing a one to one correspondence between said a dummy cables and said actual cables.

3. The system of claim 1, wherein said sleeving comprises a semi rigid plastic that follows a path traveled by said cable bundle.

4. The system of claim 1, wherein said sleeving has at least one branchout.

5. The system of claim 1, wherein the number of said plurality of dummy cable channels within said sleeving may be selected by disconnecting the connections along the edge interfaces of a predetermined number said dummy cable channels.

6. The system of claim 1, wherein each dummy cable channel contains at least one of said dummy cable.

7. The system of claim 1, wherein at least one of said actual cables comprises a first cable type and at least one additional actual cable comprises at least one additional cable type.

8. The system of claim 1, wherein said closing mechanism comprises at least one tie wrap and said actual cables comprise fiber optic cables.

9. A packaging and dressing system for cable bundles, comprising:
    a cable bundle comprising a plurality of actual cables;
    a sleeving encasing said cable bundle, comprising:
        at least one branchout;
        a plurality of dummy cables representing said plurality of actual cables wherein said plurality of dummy cables is equal in number to said plurality of actual cables to provide a one to one correspondence between said dummy cables and said actual cables; and
        a plurality of dummy cable channels holding said plurality of dummy cables, each dummy cable channel connecting along an edge interface to another dummy cable channel and each dummy cable channel being visibly transparent and containing at least one dummy cable; and
    a closing mechanism that closes said sleeving around said cable bundle.

10. A method for packaging and dressing an exposed cable bundle, comprising:
    encasing a cable bundle comprising a plurality of actual cables with a sleeving, said encasing step further comprising:
        providing a plurality of visually transparent dummy cable channels, each dummy cable channel connecting along its length to another dummy cable channel; and
        placing a plurality of dummy cables for representing said plurality of actual cables into said plurality of dummy cable channels; and
    closing said sleeving around said cable bundle.

11. The method of claim 10, wherein the plurality of dummy cables is equal in number to the plurality of dummy cable channels and each dummy cable channel contains one dummy cable.

12. The method of claim 10, wherein said plurality of dummy cables and said plurality of actual cables comprise the same number providing a one to one correspondence between said dummy cables and said actual cables.

13. The method of claim 10, wherein said sleeving comprises a semi rigid plastic that follows the path of said cable bundle.

14. The method of claim 10, further comprising distributing the weight of said dummy cables and said actual cables.

15. The method of claim 10, further comprising supporting said sleeving along a pathway.

16. The method of claim 10, further comprising selecting the number of said plurality of dummy cable channels within said sleeving by disconnecting the connections along the lengths of a predetermined number said dummy cable channels.

17. The method of claim 10, wherein said actual cables comprise fiber optic cables.

18. The method of claim 10, wherein at least one of said actual cables comprises one cable type and at least one additional actual cable comprises at least one additional cable type.

* * * * *